(12) United States Patent
Marsh

(10) Patent No.: US 7,628,227 B2
(45) Date of Patent: Dec. 8, 2009

(54) MEASURING THE WEIGHT ON A DRILL BIT DURING DRILLING OPERATIONS USING COHERENT RADIATION

(75) Inventor: Laban Marsh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/127,663

(22) Filed: May 27, 2008

(65) Prior Publication Data

US 2009/0020333 A1 Jan. 22, 2009

Related U.S. Application Data

(62) Division of application No. 10/958,571, filed on Oct. 5, 2004, now Pat. No. 7,394,064.

(51) Int. Cl.
  *E21B 47/00* (2006.01)
(52) U.S. Cl. ...................... 175/40; 73/152.46
(58) Field of Classification Search ................... 175/40; 73/152.46; 250/254
  See application file for complete search history.

(56) References Cited

U.S. PATENT DOCUMENTS

| 3,968,473 | A | 7/1976 | Patton et al. |
|---|---|---|---|
| 4,163,397 | A | 8/1979 | Harmer |
| 4,269,506 | A | 5/1981 | Johnson et al. |
| 4,656,743 | A | 4/1987 | Thiemann et al. |
| 4,849,644 | A | 7/1989 | Mira et al. |
| 5,361,854 | A | 11/1994 | Tull et al. |
| 5,386,724 | A | 2/1995 | Das et al. |
| 5,396,805 | A | 3/1995 | Surjaatmadja |
| 6,708,782 | B1 | 3/2004 | Turney |
| 7,394,064 | B2 * | 7/2008 | Marsh ........................ 250/254 |
| 2004/0075823 | A1 | 4/2004 | Lewis et al. |

FOREIGN PATENT DOCUMENTS

| GB | 1390571 | 4/1975 |
|---|---|---|
| GB | 2306825 | 5/1997 |
| WO | WO-2006041565 A1 | 4/2006 |

OTHER PUBLICATIONS

"U.S. Appl. No. 10/958,571 Notice of Allowance mailed Feb. 26, 2008.", NOAR,6 pgs.
"U.S. Appl. No. 10/958,571, Non-Final Office Action mailed Jul. 26, 2007", OARN,7.
"U.S. Appl. No. 10/958,571, Response filed Jan. 25, 2008 to Non-Final Office Action mailed Jul. 26, 2007", 12.
"International Search Report and Written Opinion for Application No. PCT/US2005/028915, date mailed Dec. 16, 2005", 11 pages.

* cited by examiner

*Primary Examiner*—Hoang Dang
(74) *Attorney, Agent, or Firm*—Schwegman, Lundberg & Woessner, P.A.

(57) ABSTRACT

One embodiment includes an apparatus that includes a coherent radiation source to emit coherent radiation through a signal carrier that is positioned along at least a part of a length of a downhole drilling component. The apparatus also includes a receiver to receive the coherent radiation that is to be emitted through the signal carrier.

17 Claims, 14 Drawing Sheets

US 7,628,227 B2

MEASURING THE WEIGHT ON A DRILL BIT DURING DRILLING OPERATIONS USING COHERENT RADIATION

RELATED APPLICATIONS

This application is a divisional under 37 C.F.R. 1.53(b) of U.S. application Ser. No. 10/958,571 filed Oct. 5, 2004, now U.S. Pat. No. 7,394,064 which is incorporated by reference herein.

This application is also related to International Application No. PCT/US2005/028915 filed Aug. 12, 2005 and published in English as WO 2006/041565 on Apr. 20, 2006.

TECHNICAL FIELD

The application relates generally to drilling operations, more particularly, to measuring the weight on a drill bit during drilling operations using coherent radiation.

BACKGROUND

Extraction of hydrocarbons from a downhole drilling operation needs to be cost effective and timely. One factor to ensure this effective and timely extraction is the proper weight on the drill bit downhole (weight-on-bit) during a drilling operation. If not enough weight is applied to the drillstring, the drill bit thereon may not bore out the hole as quickly, thereby taking longer for the extraction of these hydrocarbons. This delay in extraction may translate into lost revenue.

However, if too much weight is applied to the drill string, the drill bit and other parts of the drill string may be damaged and may be lost downhole. If parts of the drill string are damaged or lost downhole during the drilling operation, the drilling operations must stop. A fishing operation typically occurs to recover these components and clear the borehole. If such components cannot be recovered and the borehole cannot be cleared, the drilling operation may need to be restarted, wherein a new borehole is created. The time lost in such situations is costly because, instead of extracting hydrocarbons from downhole, time is wasted in these recovery/restart operations.

Therefore, monitoring of the weight on the drill bit during a drilling operation is vital for the effective and timely extraction of hydrocarbons. One approach to monitor this weight includes the measurement of a length of a drill collar of the drill string. In particular, the length of the drill collar is indicative of its compression and expansion due to the weight applied thereto. Conventional approaches for the measurement of the compression and expansion of the drill collar include the use of strain gauge sensors and/or hydraulic sensors. Such sensors either measure a physical deflection or hydraulic pressures caused when the drill collar is in compression. Disadvantageously, both the strain gauge sensors and the hydraulic sensors require calibration with specialized equipment to produce accurate results. The calibration parameters for these sensors may change over time. Moreover, such sensors are subject to damage because of the stresses that may be induced thereon during drilling operations. Additionally, the hydraulic sensors may develop leaks and require periodic maintenance to replace o-rings, fluids, etc.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for measuring the weight on a drill bit during drilling operations using coherent radiation are described. In the following description, numerous specific details are set forth. However, it is understood that embodiments of the invention may be practiced without these specific details. In other instances, well-known circuits, structures and techniques have not been shown in detail in order not to obscure the understanding of this description. While described with reference to measurement of compression/expansion of the drill collar, embodiments of the invention are not so limited. For example, embodiments of the invention may be used for measuring the compression/expansion of any other type of downhole drilling component that may be indicative of the weight on the drill bit.

Figure 1:
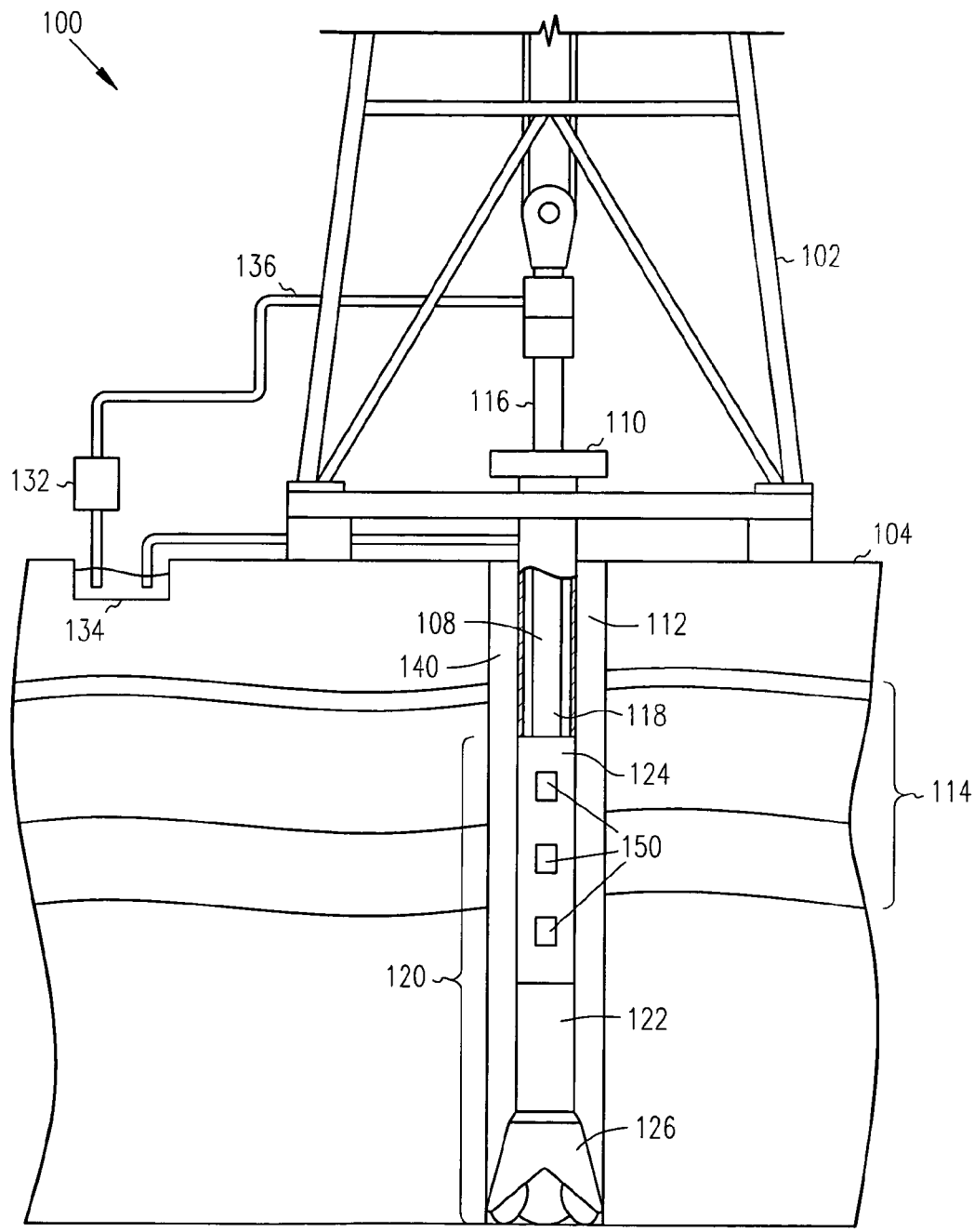
FIG. 1 illustrates a system for drilling operations, according to one embodiment of the invention.

FIG. 1 illustrates a system for drilling operations, according to one embodiment of the invention. A system 100 includes a drilling rig 102 located at a surface 104 of a well. The drilling rig 102 provides support for a drill string 108. The drill string 108 penetrates a rotary table 110 for drilling a borehole 112 through subsurface formations 114. The drill string 108 includes a Kelly 116 (in the upper portion), a drill pipe 118 and a bottom hole assembly 120 (located at the lower portion of the drill pipe 118). The bottom hole assembly 120 may include a drill collar 122, a downhole tool 124 and a drill bit 126. The downhole tool 124 may be any of a number of different types of tools including Measurement While Drilling (MWD) tools, Logging While Drilling (LWD) tools, etc.

During drilling operations, the drill string 108 (including the Kelly 116, the drill pipe 118 and the bottom hole assembly 120) may be rotated by the rotary table 110. In addition or alternative to such rotation, the bottom hole assembly 120 may also be rotated by a motor (not shown) that is downhole. The drill collar 122 may be used to add weight to the drill bit 126. The drill collar 122 also may stiffen the bottom hole assembly 120 to allow the bottom hole assembly 120 to transfer the weight to the drill bit 126. Accordingly, this weight provided by the drill collar 122 also assists the drill bit 126 in the penetration of the surface 104 and the subsurface formations 114.

During drilling operations, a mud pump 132 may pump drilling fluid (known as "drilling mud") from a mud pit 134 through a hose 136 into the drill pipe 118 down to the drill bit 126. The drilling fluid can flow out from the drill bit 126 and return back to the surface through an annular area 140 between the drill pipe 118 and the sides of the borehole 112. The drilling fluid may then be returned to the mud pit 134, where such fluid is filtered. Accordingly, the drilling fluid can cool the drill bit 126 as well as provide for lubrication of the drill bit 126 during the drilling operation. Additionally, the drilling fluid removes the cuttings of the subsurface formations 114 created by the drill bit 126.

The downhole tool 124 may include one to a number of different sensors 150, which monitor different downhole parameters and generate data that is stored within one or more different storage mediums within the downhole tool 124. The type of downhole tool 124 and the type of sensors 150 thereon may be dependent on the type of downhole parameters being measured. Such parameters may include the downhole temperature and pressure, the various characteristics of the subsurface formations (such as resistivity, density, porosity, etc.), the characteristics of the borehole (e.g., size, shape, etc.), etc.

In some embodiments, the drill collar 122 may include, along its length, one or more signal carriers, such as hollow measurement tubes. The drill collar 122 may also include instrumentation (such as a coherent radiation source, receiver, etc.) for measurement of a coherent radiation being transmitted through the signal carrier(s). This measurement of coherent radiation allows for the measurement of a length of the drill collar 122. Based on the measurement of the length of the drill collar 122, the weight on the drill bit 126 may be determined.

As shown, in some embodiments, the drill collar 122 is adjacent to the drill bit 126. However, embodiments of the invention are not so limited. For example, in an embodiment, the bottom hole assembly 120 is configured such that the downhole tool 124 is between the drill bit 126 and the drill collar 122. The weight on drill bit 126 may be determined based on the length of the drill collar 122 on any of such configurations of the bottom hole assembly 120.

Figure 2A:
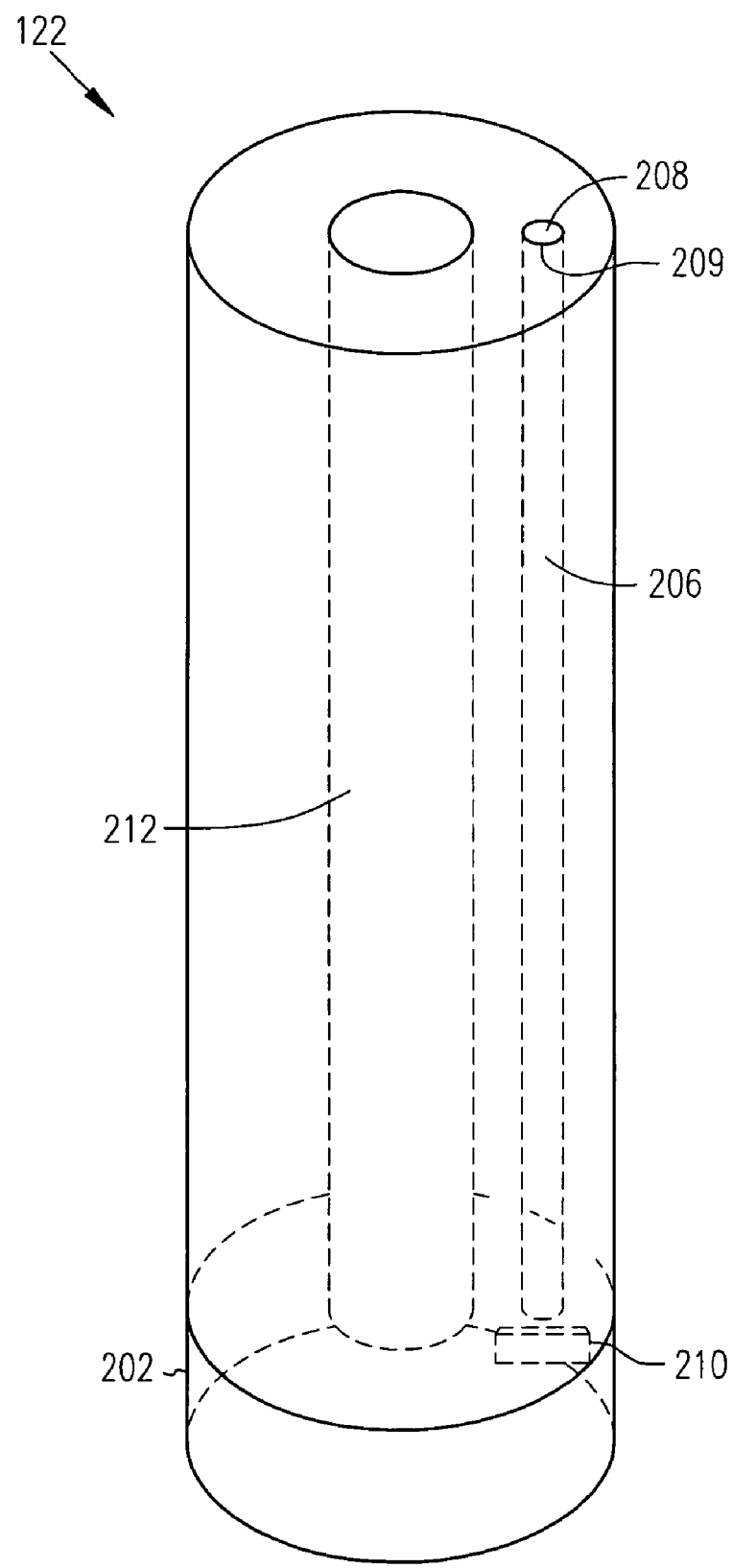
FIG. 2A illustrates a drill collar having components for determining a weight on a drill bit based on a measurement of a length of the drill collar using coherent radiation, according to one embodiment of the invention.

FIG. 2A illustrates a drill collar having components for determining a weight on a drill bit based on a measurement of a length of the drill collar using coherent radiation, according to one embodiment of the invention. In particular, FIG. 2A illustrates the drill collar 122 having a pipe 212, a signal carrier 206, a plug 208 having a reflective surface 209, an instrumentation section 202 that may include instruments 210. As further described below, the instruments 210 may include a coherent radiation source, a receiver, a control device, a storage medium, reflective components, a detector, lens, etc. In some embodiments, the internal surfaces of the signal carrier 206 may be essentially nonreflective; while, in alternative embodiments, the internal surfaces of the signal carrier 206 may be reflective.

Figure 2B:
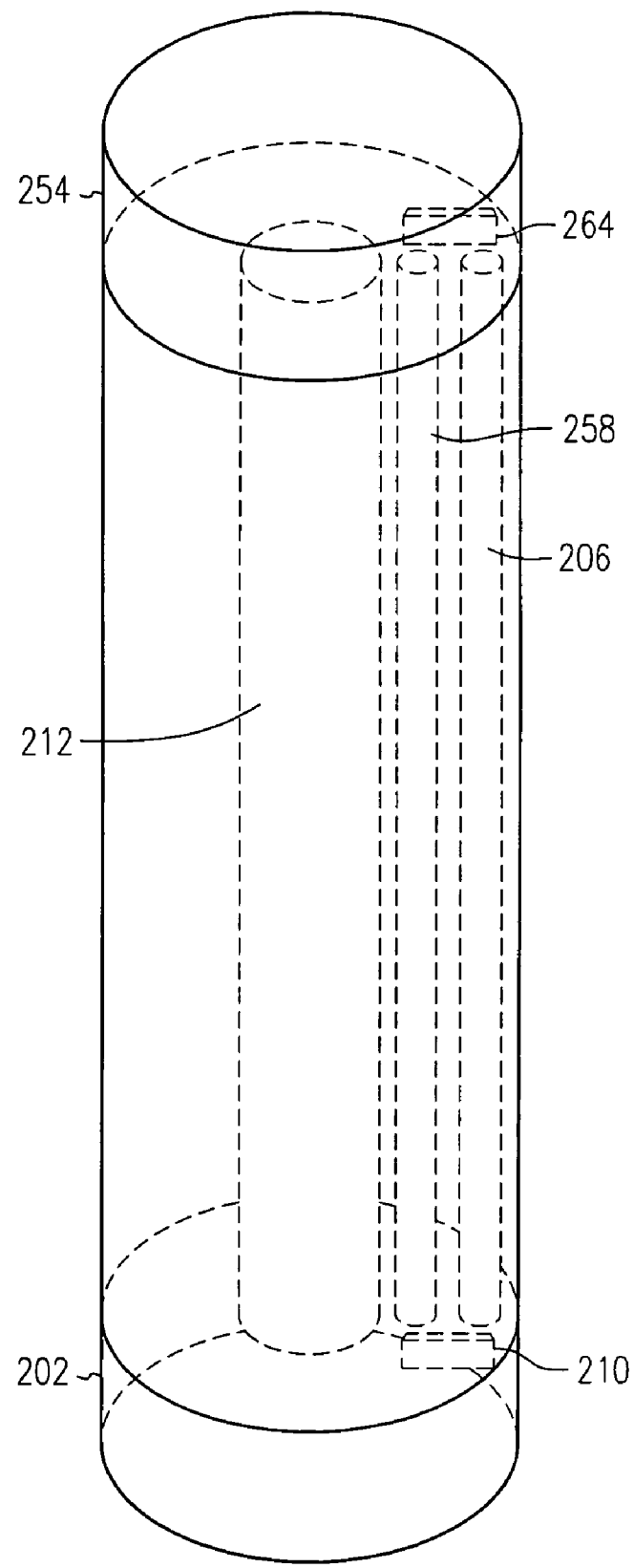
FIG. 2B illustrates an alternative drill collar having components for determining a weight on a drill bit based on a measurement of a length of the drill collar using coherent radiation, according to one embodiment of the invention.

FIG. 2B illustrates an alternative drill collar having components for determining a weight on a drill bit based on a measurement of a length of the drill collar using coherent radiation, according to one embodiment of the invention. FIG. 2B illustrates the drill collar 122 having the pipe 212, the signal carrier 206, a signal carrier 258, the instrumentation section 202 and an instrumentation section 254. The instrumentation section 254 includes a reflective component 264.

With regard to the embodiments of FIGS. 2A-2B, in some embodiments, the internal surfaces of the signal carrier 206 and/or the signal carrier 258 may be essentially nonreflective; while, in alternative embodiments, the internal surfaces of the signal carrier 206 and/or the signal carrier 258 may be reflective. The signal carrier 206 and/or the signal carrier 258 may be a hollow measurement tube. In some embodiments, the signal carrier 206 and/or the signal carrier 258 may be filled with any suitable gas or liquid that is approximately transparent. For example, the signal carrier 206 and/or the signal carrier 258 may be filled with $O_2$, $H_2O$, etc. The filling of the signal carrier 206 and/or the signal carrier 258 with a liquid may make the drill collar 122 more stronger structurally in comparison to filling of the signal carrier 206 and/or the signal carrier 258 with a gas.

As further described below, embodiments of FIGS. 2A-2B may be used to make a measurement of coherent radiation transmitted along a length of the drill collar 122. In some embodiments, the measurement may include a "time-of-flight" measurement. Alternatively or in addition, the measurement may include a measurement of a difference between a phase of the coherent radiation emitted and the phase of the coherent radiation received. Alternatively or in addition, the measurement may include a measurement of the angular displacement of the coherent radiation.

Figure 10:
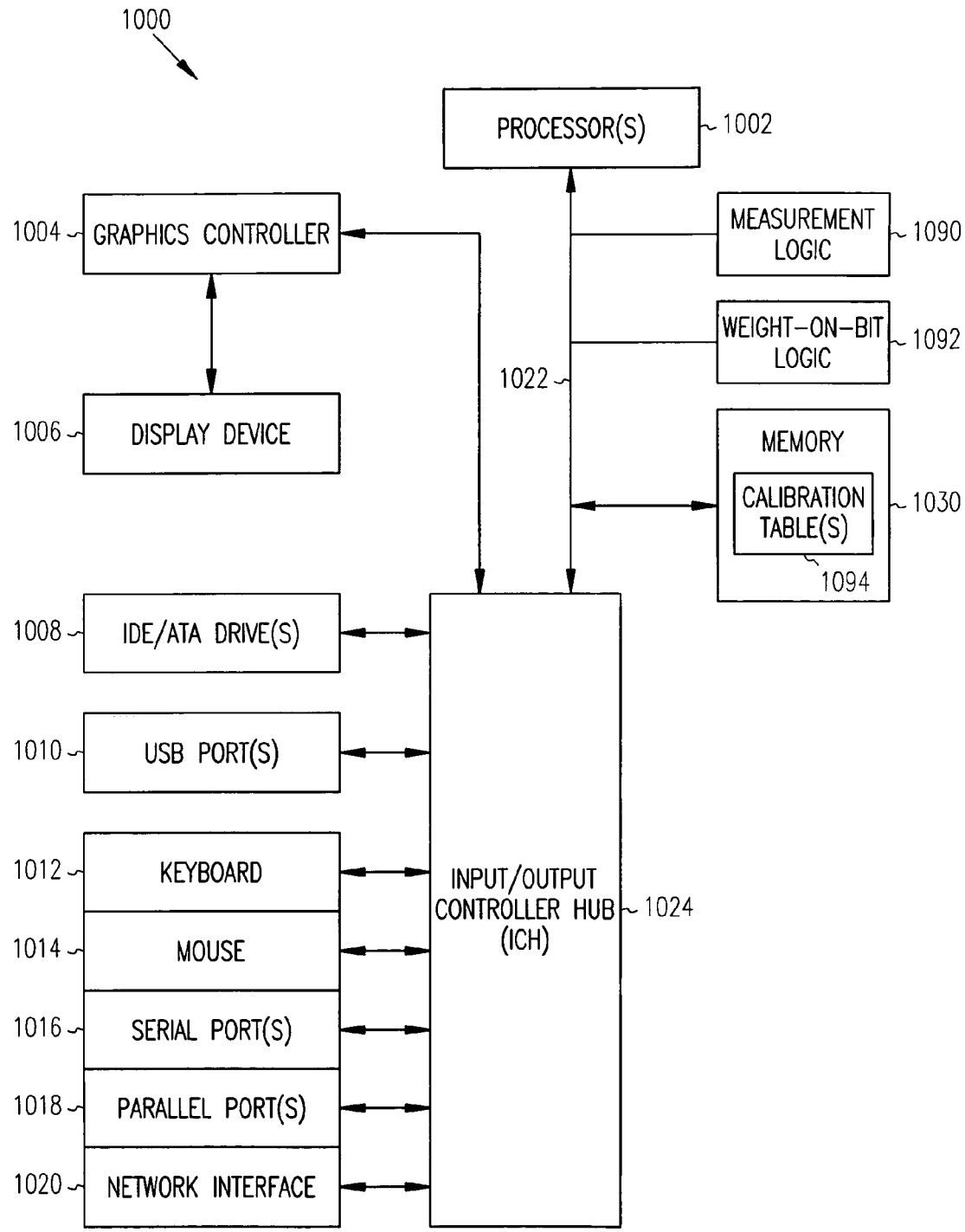
FIG. 10 illustrates a computer device for determining the weight on a drill bit based on a length of a drill collar measured using a coherent radiation, according to one embodiment of the invention.
Figure 11:
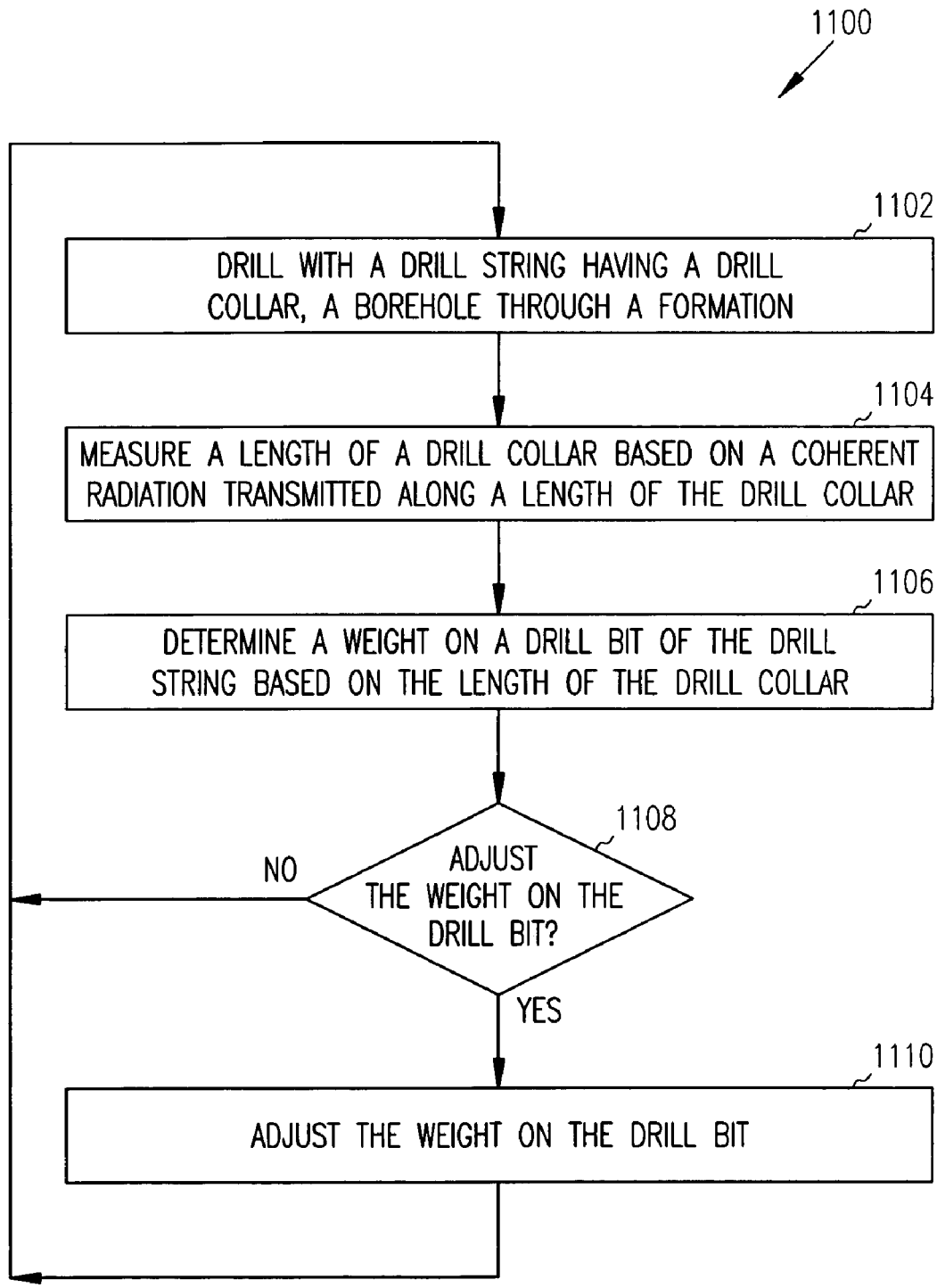
FIG. 11 illustrates a flow diagram for drilling a borehole using a weight on the drill bit that is determined based on a length of a drill collar measured using a coherent radiation, according to one embodiment of the invention.

This measurement may then be transmitted to a computer device at the surface. In some embodiments, this measurement is transmitted to the surface using any suitable telemetry operation (such as mud pulse telemetry, electromagnetic telemetry, etc.). Such a computer device may then determine a length of the drill collar 122. Based on this length, the computer device may determine the weight on the drill bit 126. One embodiment of such a computer device is illustrated in FIG. 10, which is described in more detail below. An embodiment of a flow diagram for determining the length of the drill collar 122 and the weight on the drill bit 126 is illustrated in FIG. 11, which is described in more detail below. The different configurations of the signal carriers 206/258 and instrumentation sections 202/210 are not limited to those illustrated in FIGS. 2A-2B. For example, in some embodiments, a single signal carrier may be used in conjunction with two instrumentation sections on the two opposing ends of such a carrier. Examples of such embodiments are illustrated in FIGS. 6A-6B, which are described in more detail below. Different embodiments of the instrumentation sections 202 and 254 and signal carriers 206 and 258 are illustrated in FIGS. 3-8, which are now described.

Figure 3:
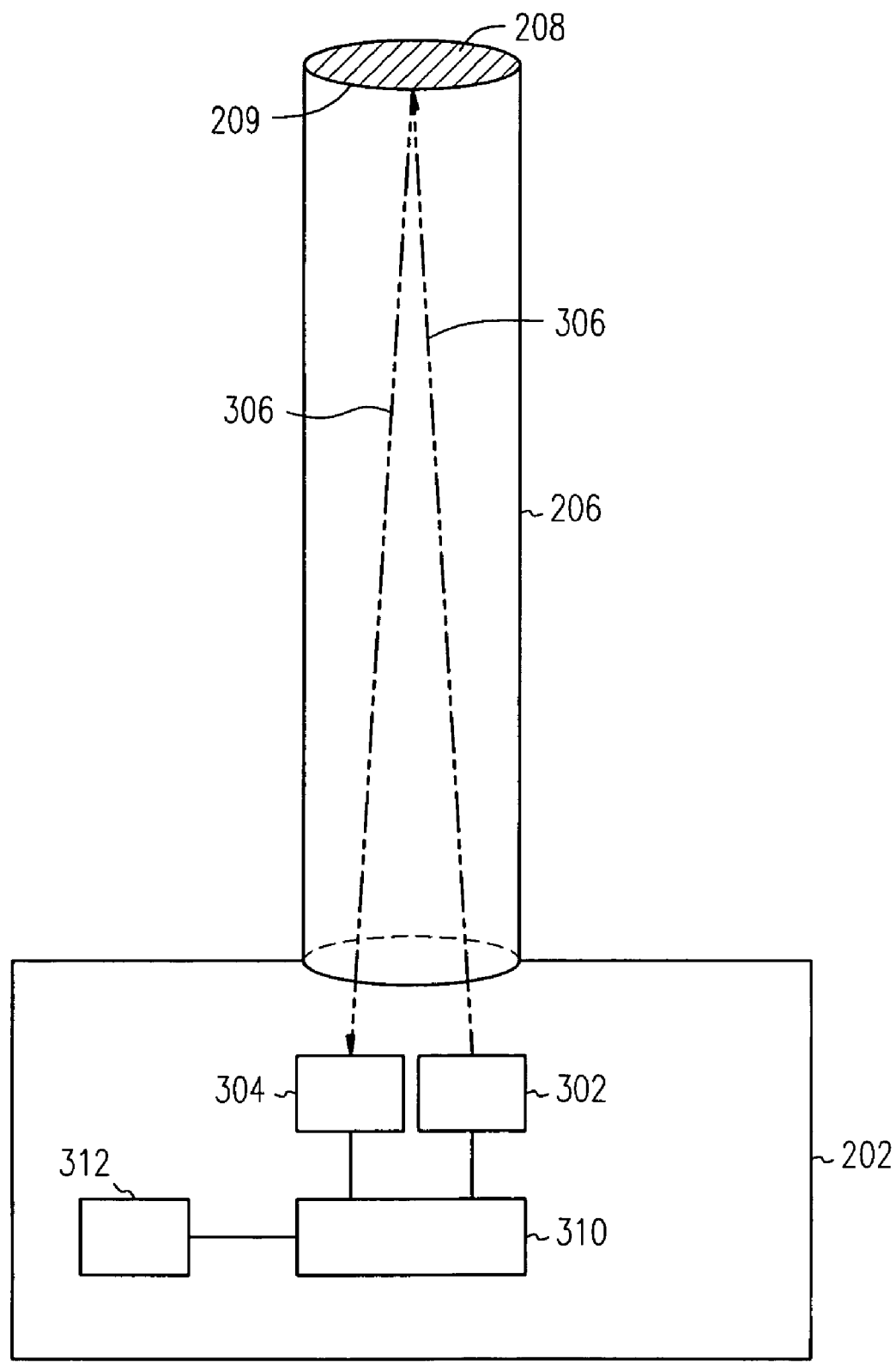
FIG. 3 illustrates a single signal carrier within a drill collar and instrumentation for determining a weight on a drill bit based on a measurement of a length of the drill collar using coherent radiation, according to one embodiment of the invention.

FIG. 3 illustrates a single signal carrier within a drill collar and instrumentation for determining a weight on a drill bit based on a measurement of a length of the drill collar using coherent radiation, according to one embodiment of the invention. FIG. 3 illustrates the signal carrier 206, the plug 208 having the reflective surface 209 and the instrumentation section 202. The instrumentation section 202 is at a first end of the signal carrier 206 and includes a coherent radiation source 302, a receiver 304, a control device 310 and a storage medium 312. The control device 310 is coupled to the coherent radiation source 302, the receiver 304 and the storage medium 312. The plug 208 is at a second end of the signal carrier 206. As shown, the diameter of the signal carrier 206 and the size of the coherent radiation source 302 and the receiver 304 are such that both the coherent radiation source 302 and the receiver 304 can fit within the opening at the first end of the signal carrier 206.

The reflective surface 209 may be any suitable surface for reflecting a coherent radiation 306 back to the receiver 304. For example, the reflective surface 209 may be a mirrored surface. Alternatively, the reflective surface 209 may be composed of metal that can be flattened, polished and silvered. The coherent radiation 306 may be a (Light Amplification by Simulated Emission of Radiation) LASER signal, light emitting diode signal or any other type of focused light source. The storage medium 312 may be any of a number of different types of mediums, including different types of Random Access Memory (RAM), FLASH memory, magnetic disk drives, etc. For example, the storage medium 312 can be a Static RAM (SRAM), a Synchronous Dynamic RAM (SDRAM), DRAM, a double data rate (DDR) Synchronous Dynamic RAM (SDRAM), etc.

In operation, the coherent radiation source 302 emits coherent radiation 306 down the signal carrier 206 toward the plug 208. The reflective surface 209 of the plug 208 reflects the coherent radiation 306 back toward the first end of the signal carrier 206. The receiver 304 receives the coherent radiation 306. In one embodiment, the coherent radiation source 302 and the receiver 304 may include a beam splitter to split the coherent radiation 306 between a transmitter element and a receiver element. In an embodiment, the coherent radiation 306 travels through the signal carrier 206 without contact with or reflecting off the surfaces of the signal carrier 206.

This emission and receipt of the coherent radiation 306 may be used to measure the length of the drill collar 122 (that includes the signal carrier 306). For example, a "time-of-flight" measurement may be used to measure the length of the drill collar 122. The control device 310 may include counters to measure the time from which the coherent radiation source 302 emits the coherent radiation 306 to the time the receiver 304 receives the coherent radiation 306. In some embodiments, the coherent radiation source 302 emits the coherent radiation 306 as short pulses of coherent radiation (turn-on/turn-off characteristics) in order to measure the "time-of-flight" measurement using counters in the control device 310. The control device 310 may store this "time-of-flight" measurement into the storage medium 312.

This emission and receipt of the coherent radiation 306 may also or alternatively may be used to measure the length of the drill collar 122 based on a change between the phase of the coherent radiation 306 emitted and the phase of the coherent radiation 306 received. Such measurements may be transmitted to a computer device at the surface using any suitable telemetry operation. The computer device may determine the length of the drill collar 122 and the weight on the drill bit 126 based on one or more of these measurements using calibration tables, which is described in more detail below. Accordingly, the weight on the drill bit 126 may be adjusted (increased or decreased) to an approximately maximum value for drilling the borehole, without damage to the equipment (e.g., the drill bit 126) downhole.

Figure 4:
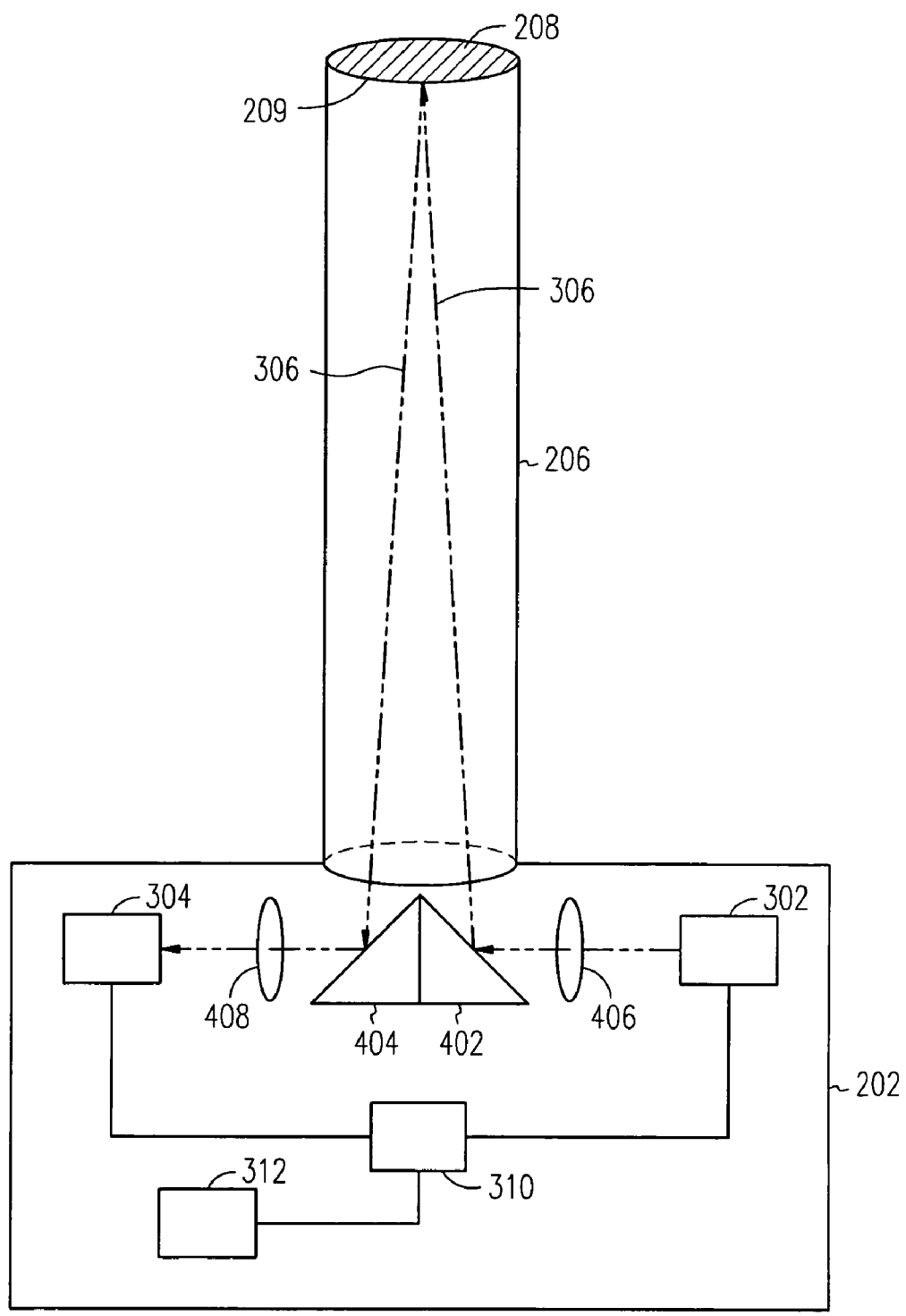
FIG. 4 illustrates an alternative configuration for a single signal carrier within a drill collar and instrumentation for determining a weight on a drill bit based on a measurement of a length of the drill collar using coherent radiation, according to one embodiment of the invention.

FIG. 4 illustrates an alternative configuration for a single signal carrier within a drill collar and instrumentation for determining a weight on a drill bit based on a measurement of a length of the drill collar using coherent radiation, according to one embodiment of the invention. This embodiment may be used if the diameter of the signal carrier 206 and the size of the coherent radiation source 302 and the receiver 304 are such that both the coherent radiation source 302 and the receiver 304 cannot fit within the opening at a first end of the signal carrier 206. FIG. 4 illustrates the signal carrier 206, the plug 208 having the reflective surface 209 and the instrumentation section 202.

The instrumentation section 202 is at the first end of the signal carrier 206 and may include the coherent radiation source 302, a lens 406, a reflective component 402, a reflective component 404, a lens 408, the receiver 304, the control device 310 and the storage medium 312. The control device 310 is coupled to the coherent radiation source 302, the receiver 304 and the storage medium 312. The plug 208 is at the second end of the signal carrier 206.

In operation, the coherent radiation source 302 emits the coherent radiation 306 through the lens 406 toward the reflective component 402. The lens 406 spreads out the coherent radiation 306 so that the diameter of the coherent radiation 306 is larger and thus less likely to be lost during its transmission. The reflective component 402 reflects the coherent radiation 306 down the signal carrier 206 toward the plug 208. The reflective surface 209 reflects the coherent radiation 306 back toward the first end of the signal carrier 206. The reflective component 404 receives the coherent radiation 306 and reflects the coherent radiation 306 through the lens 408 toward the receiver 304. The lens 408 refocuses the coherent radiation 306 that was spread out by the lens 406. The receiver 304 receives the coherent radiation 306. In an embodiment, the coherent radiation 306 travels through the signal carrier 206 without contact with or reflecting off the surfaces of the signal carrier 206. In some embodiments, the signal carrier 206 may include essentially nonreflective surfaces.

As described above, this emission and receipt of the coherent radiation 306 may be used to measure the length of the drill collar 122 (that includes the signal carrier 306 and the signal carrier 708). Such measurements may include "timeof-flight" measurement, phase change measurements, etc. The control device 310 may store the measurement of the coherent radiation 306 that is used to determine the length of the drill collar 122 into the storage medium 312. The control device 310 may also transmit this measurement to the computer device on the surface using any suitable telemetry operation. The computer device at the surface may determine a length of the drill collar 122 and may determine the weight on the drill bit 126 based on this measured length of the drill collar 122 and adjust such weight if necessary.

Figure 5:
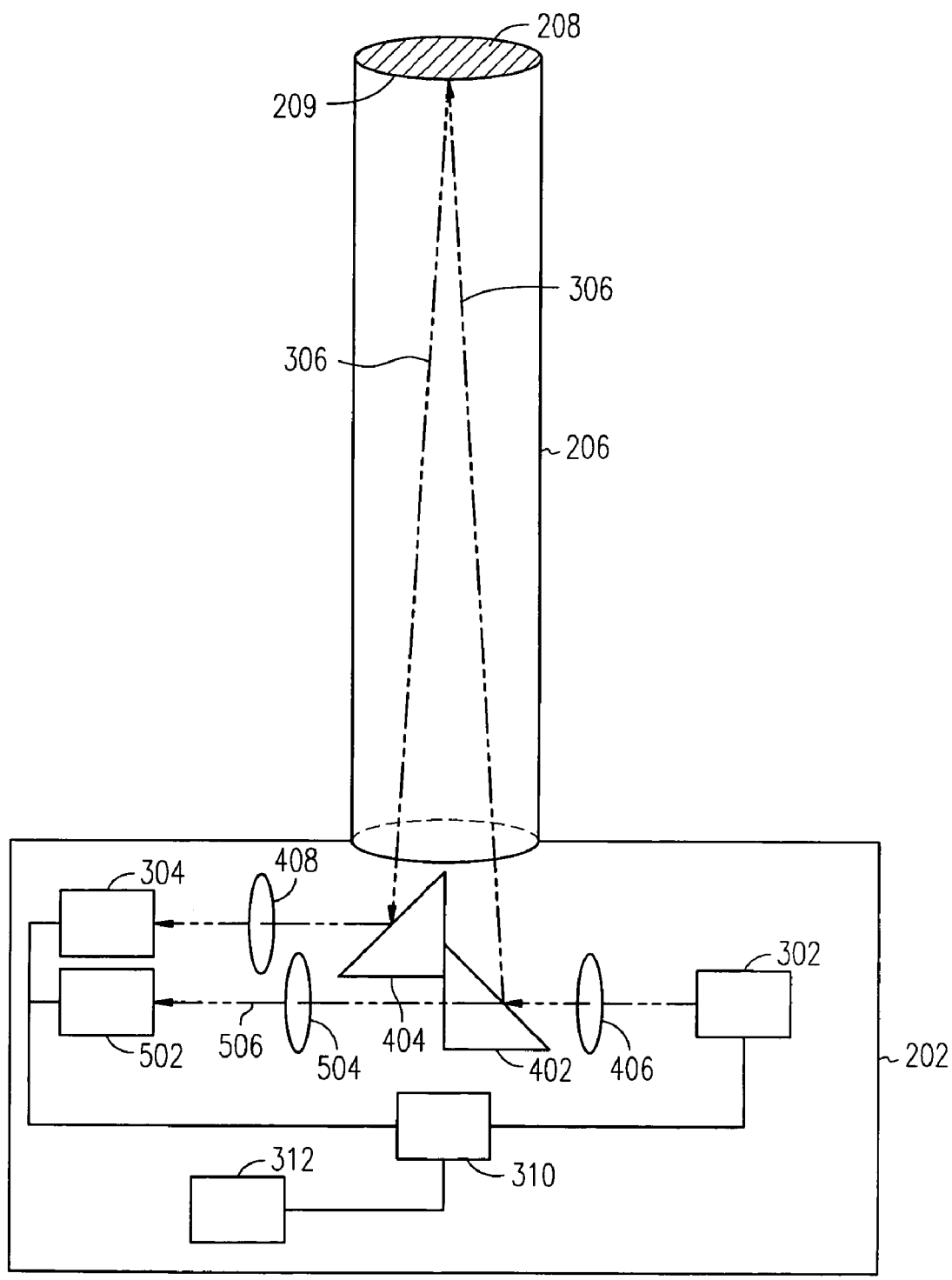
FIG. 5 illustrates an alternative configuration for a single signal carrier within a drill collar and instrumentation for determining a weight on a drill bit based on a measurement of a length of the drill collar using coherent radiation, according to one embodiment of the invention.
Figure 6A:
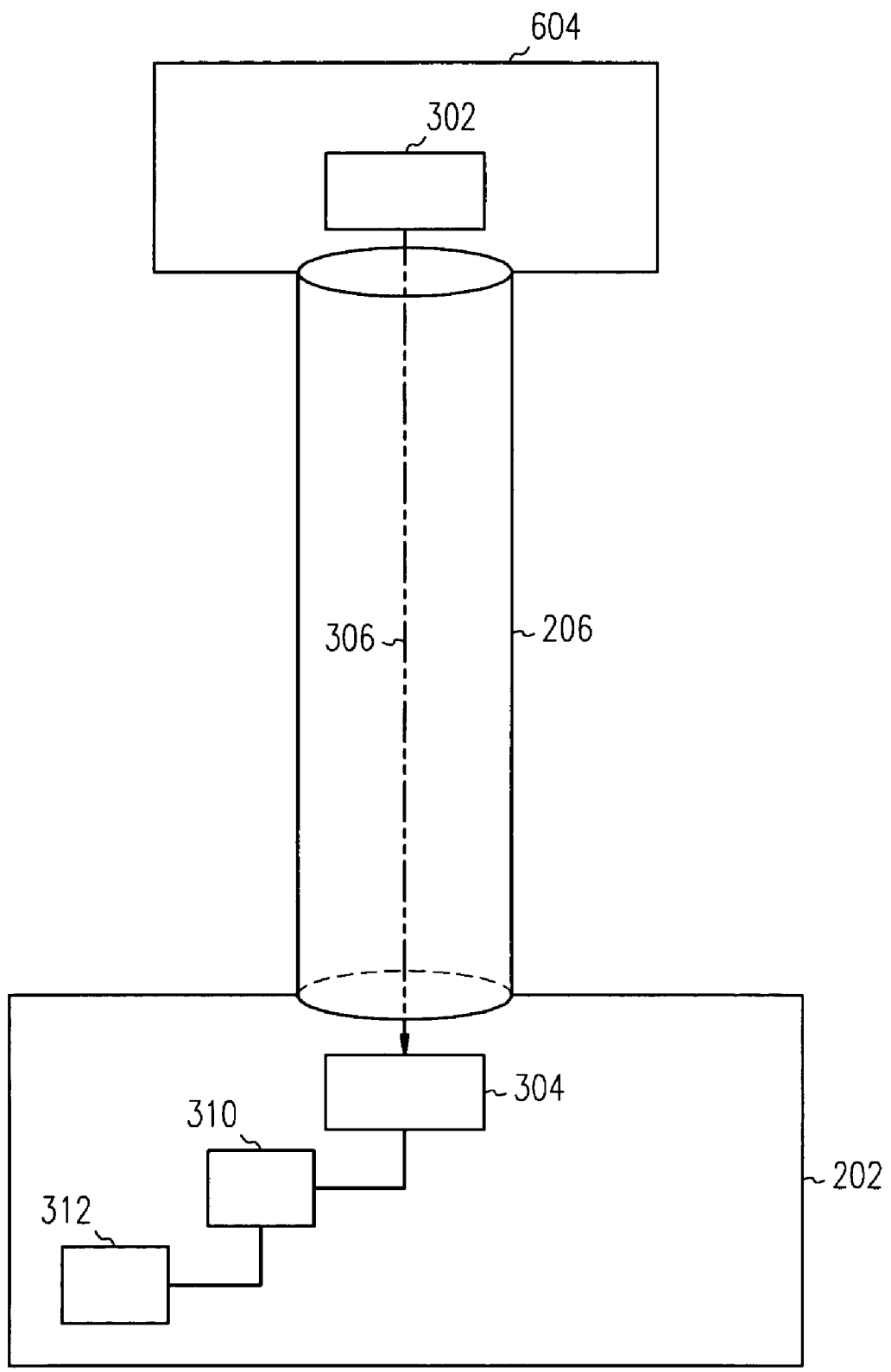
FIG. 6A illustrates an alternative configuration for a single signal carrier within a drill collar and instrumentation for determining a weight on a drill bit based on a measurement of a length of the drill collar using coherent radiation, according to one embodiment of the invention.
Figure 6B:
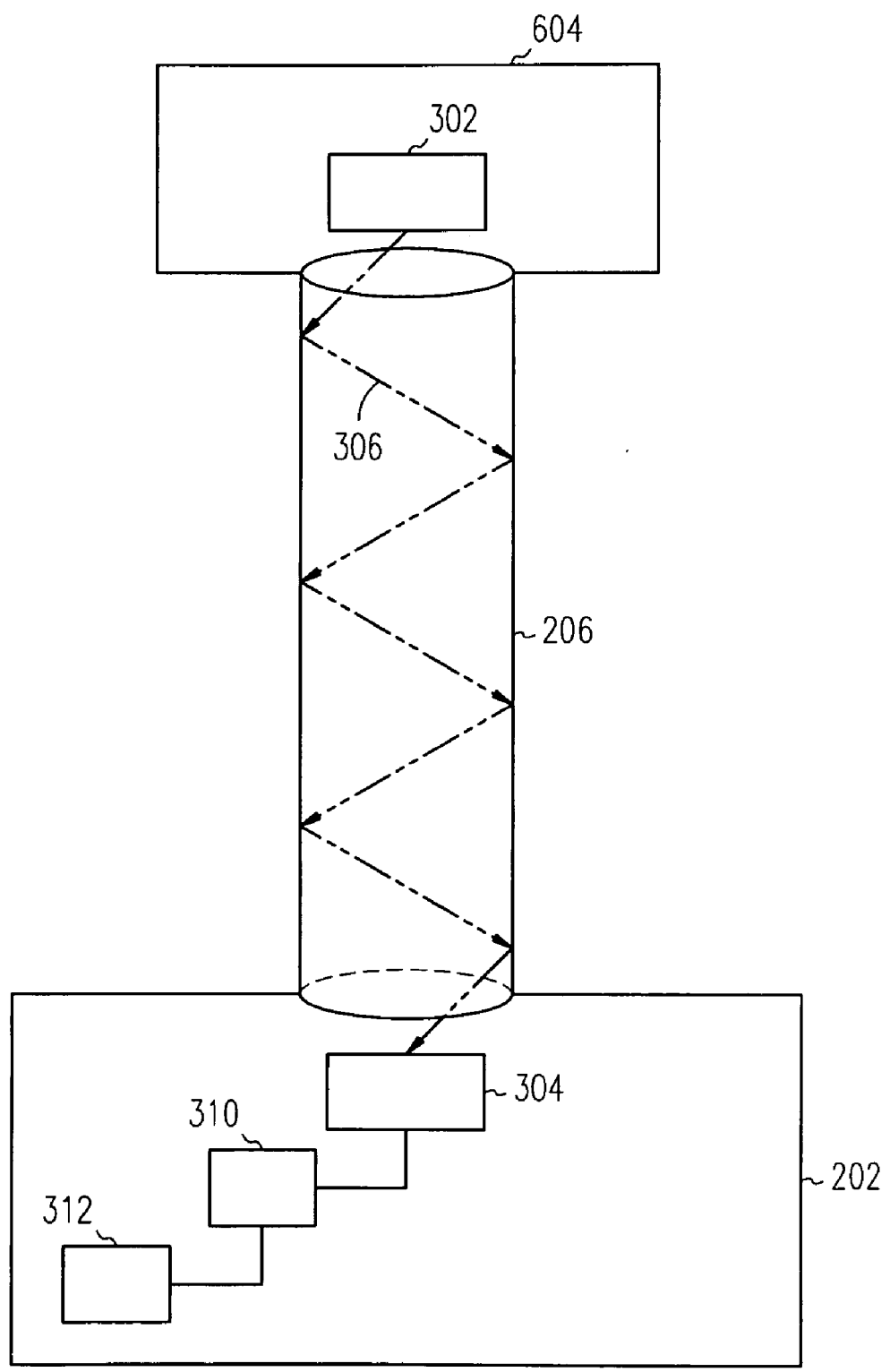
FIG. 6B illustrates an alternative configuration for a single signal carrier within a drill collar and instrumentation for determining a weight on a drill bit based on a measurement of a length of the drill collar using coherent radiation, according to one embodiment of the invention.

FIG. 5 illustrates an alternative configuration for a single signal carrier within a drill collar and instrumentation for determining a weight on a drill bit based on a measurement of a length of the drill collar using coherent radiation, according to one embodiment of the invention. This embodiment may also be used if the diameter of the signal carrier 206 and the size of the coherent radiation source 302 and the receiver 304 are such that both the coherent radiation source 302 and the receiver 304 cannot fit within the opening of at a first end of the signal carrier 206. Moreover, this embodiment may be used for a measurement of the drill collar 122 based on a difference in time when a first receiver and a second receiver receive the coherent radiation 306. In particular, this embodiment includes a reference signal that is compared to the coherent radiation 306 that is transmitted down the signal carrier 206. Such an embodiment may not require high-speed counters that may be needed in a "time-of-flight" measurement.

FIG. 5 illustrates the signal carrier 206, the plug 208 having the reflective surface 209 and the instrumentation section 202. The instrumentation section 202 is at the first end of the signal carrier 206 and may include the coherent radiation source 302, the lens 406, the reflective component 402, the reflective component 404, the lens 408, the receiver 304, a lens 504, a receiver 502, the control device 310 and the storage medium 312. The control device 310 is coupled to the coherent radiation source 302, the receiver 304, the receiver 502 and the storage medium 312. The plug 208 is at the second end of the signal carrier 206.

A surface of the reflective component 402 may be partially transmissive and partially reflective. The reflective component 402 and the reflective component 404 may be offset relative to each other. Accordingly, a part of the coherent radiation 306 is reflected toward the second end of the signal carrier 206, while a different part of the coherent radiation 306 (the reference signal) passes through the surface of the reflective component 402, as coherent radiation 506 toward the receiver 502 (without being transmitted down the signal carrier 206).

In operation, the coherent radiation source 302 emits the coherent radiation 306 through the lens 406 toward the reflective component 402. The lens 406 spreads out the coherent radiation 306. The reflective component 402 reflects a first part of the coherent radiation 306 down the signal carrier 206 toward the plug 208. The reflective surface 209 reflects the first part of the coherent radiation 306 back toward the first end of the signal carrier 206. The reflective component 404 receives the first part of the coherent radiation 306 and reflects the first part of the coherent radiation 306 through the lens 408 toward the receiver 304. The lens 408 refocuses the first part of the coherent radiation 306 that was spread out by the lens 406. The receiver 304 receives the first part of the coherent radiation 306. In an embodiment, the first part of the coherent radiation 306 travels through the signal carrier 206 without contact with or reflecting off the surfaces of the signal carrier 206. In some embodiments, the signal carrier 206 may include essentially nonreflective surfaces. The reflective component 402 allows the passage of a second part of the coherent radiation 306 through as the coherent radiation 506. The receiver 502 receives the coherent radiation 506 (the reference signal) through the lens 504. The lens 504 refocuses the coherent radiation 506 that was spread out by the lens 406.

Accordingly, the coherent radiation source 302 emits the coherent radiation 306, which is received by the receiver 502 at time point one and is received by the receiver 304 at time point two. The control device 310 may determine a difference between time point two and time point one. The control device 310 may store this time difference into the storage medium 312. As described above, the control device 310 may also transmit this time difference to the computer device on the surface using any suitable telemetry operation. The computer device at the surface may then determine a length of the drill collar 122 based on this time difference. The computer device at the surface may determine the weight on the drill bit 126 based on this measured length of the drill collar 122 and adjust such weight if necessary.

FIG. 6A illustrates an alternative configuration for a single signal carrier within a drill collar and instrumentation for determining a weight on a drill bit based on a measurement of a length of the drill collar using coherent radiation, according to one embodiment of the invention. In particular, FIG. 6A illustrates an embodiment, wherein the coherent radiation source 302 and the receiver 304 are at opposing ends of the signal carrier 206.

FIG. 6A illustrates the signal carrier 206, the instrumentation section 202 and an instrumentation section 604. The instrumentation section 202 is at the first end of the signal carrier 206 and includes the receiver 304, the control device 310 and the storage medium 312. The control device 310 is coupled to the receiver 304 and the storage medium 312. The instrumentation section 604 is at the second end of the signal carrier 206 and includes the coherent radiation source 302.

In operation, the coherent radiation source 302 emits the coherent radiation 306 down the signal carrier 206 toward the first end without contact with or reflecting off the surfaces of the signal carrier 206. The coherent radiation source 302 may transmit, to the control device 310, the time point when the coherent radiation 306 was emitted. In some embodiments, the coherent radiation source 302 transmits this data using any suitable telemetry operation (such as electromagnetic telemetry, etc.).

The control device 310 may then determine a "time of flight" measurement based on a difference between the time point that the coherent radiation 306 was received and the time point that the coherent radiation 306 was emitted. The control device 310 may store this time difference into the storage medium 312. As described above, the control device 310 may also transmit this time difference to the computer device on the surface using any suitable telemetry operation. The computer device at the surface may then determine a length of the drill collar 122 based on this time difference. Additionally, the computer device at the surface may determine the weight on the drill bit 126 based on this measured length of the drill collar 122 and adjust such weight if necessary.

FIG. 6B illustrates an alternative configuration for a single signal carrier within a drill collar and instrumentation for determining a weight on a drill bit based on a measurement of a length of the drill collar using coherent radiation, according to one embodiment of the invention. In particular, FIG. 6B illustrates an embodiment, wherein the coherent radiation source 302 and the receiver 304 are at opposing ends of the signal carrier 206.

FIG. 6B illustrates the signal carrier 206, the instrumentation section 202 and the instrumentation section 604. The instrumentation section 202 is at the first end of the signal carrier 206 and includes the receiver 304, the control device 310 and the storage medium 312. The control device 310 is coupled to the receiver 304 and the storage medium 312. The instrumentation section 604 is at the second end of the signal carrier 206 and includes the coherent radiation source 302. As shown, the signal carrier 206 may include reflective surfaces.

In operation, the coherent radiation source 302 emits the coherent radiation 306 toward a first reflective surface of the signal carrier 206. The coherent radiation 306 is reflected off the first reflective surface toward a second reflective surface of the signal carrier 206. As shown, the coherent radiation 306 reflects between the first reflective surface and the second reflective surface of the signal carrier 206 while progressing toward the first end of the signal carrier 206 until the coherent radiation 306 is received by the receiver 304.

Similarly to the embodiment of FIG. 6A, the coherent radiation source 302 may transmit, to the control device 310, the time point when the coherent radiation 306 was emitted. The control device 310 may then determine a "time of flight" measurement based on a difference between the time point that the coherent radiation 306 was received and the time point that the coherent radiation 306 was emitted. The control device 310 may store this time difference into the storage medium 312. As described above, the control device 310 may also transmit this time difference to the computer device on the surface using any suitable telemetry operation. The computer device at the surface may then determine a length of the drill collar 122 based on this time difference. Additionally, the computer device at the surface may determine the weight on the drill bit 126 based on this measured length of the drill collar 122 and adjust such weight if necessary.

Figure 7:
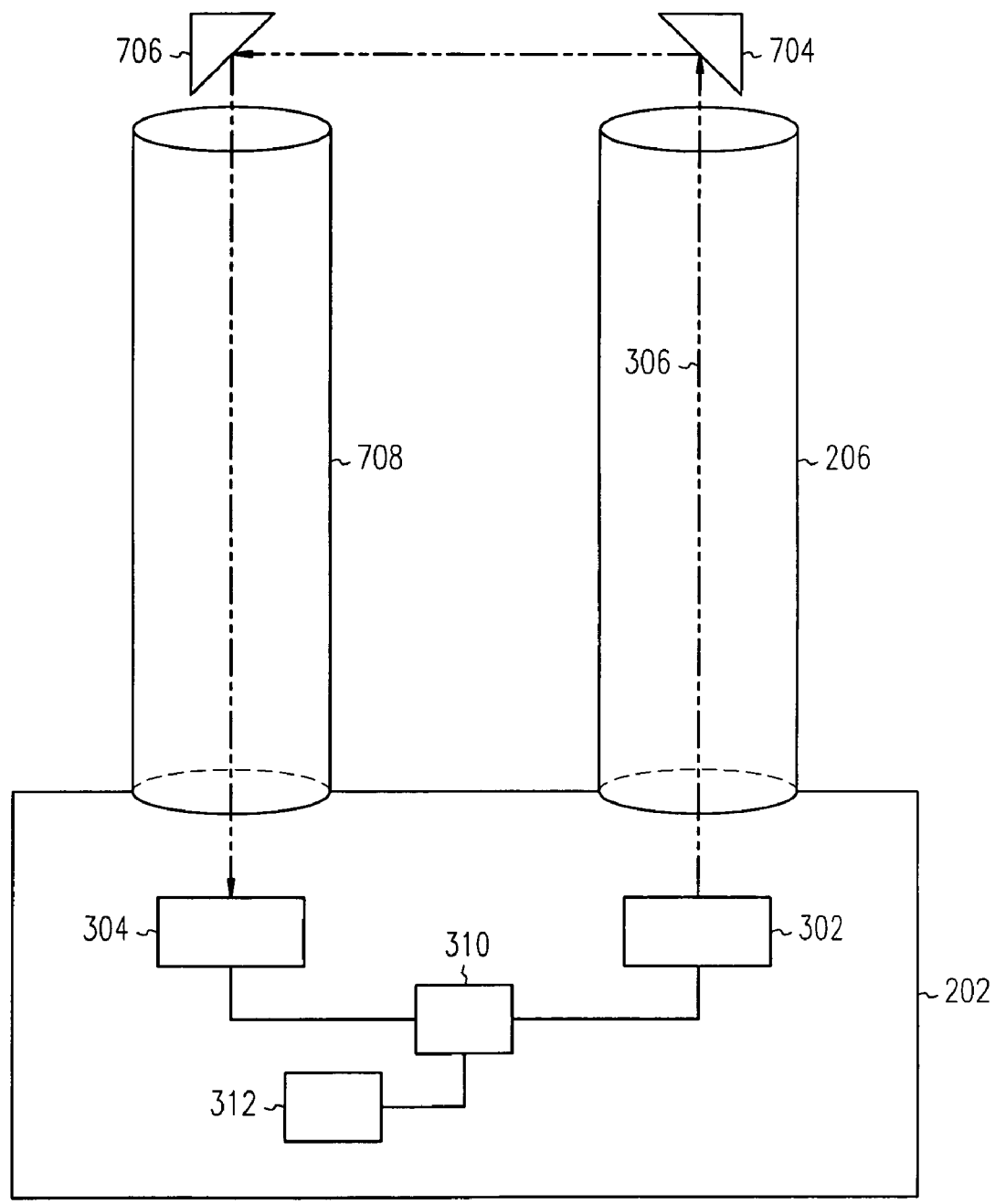
FIG. 7 illustrates two signal carriers within a drill collar and instrumentation for determining a weight on a drill bit based on a measurement of a length of the drill collar using coherent radiation, according to one embodiment of the invention.

FIG. 7 illustrates two signal carriers within a drill collar and instrumentation for determining a weight on a drill bit based on a measurement of a length of the drill collar using coherent radiation, according to one embodiment of the invention. This embodiment may also be used if the diameter of the signal carrier 206 and the size of the coherent radiation source 302 and the receiver 304 are such that both the coherent radiation source 302 and the receiver 304 cannot fit within the opening at a first end of the signal carrier 206.

The embodiment of FIG. 7 includes the signal carrier 206, a signal carrier 708, a reflective component 704, a reflective component 706 and an instrumentation section 202. The instrumentation section 202 is at the first end of the signal carrier 206 and the signal carrier 708 and includes the coherent radiation source 302, the receiver 304, the control device 310 and the storage medium 312. The control device 310 is coupled to the coherent radiation source 302, the receiver 304 and the storage medium 312. The reflective component 704 and the reflective component 706 are at the second end of the signal carrier 206 and the signal carrier 708, respectively.

In operation, the coherent radiation source 302 emits the coherent radiation 306 down the signal carrier 206 toward the second end. A surface of the reflective component 704 is positioned to reflect the coherent radiation 306 toward a surface of the reflective component 706. A surface of the reflective component 706 is positioned to reflect the coherent radiation 306 down the signal carrier 708 toward the first end. The receiver 304 receives the coherent radiation 306. In an embodiment, the coherent radiation 306 travels through the signal carrier 206 and the signal carrier 708 without contact with or reflecting off the surfaces of the signal carrier 206 and the signal carrier 708. In some embodiments, the signal carrier 206 and the signal carrier 708 may include essentially nonreflective surfaces.

The control device 310 may store a measurement of the coherent radiation 306. For example, the measurement may include a "time-of-flight" measurement, a phase difference between the coherent radiation 306 emitted and the coherent radiation 306 received, etc. The computer device at the surface may determine a length of the drill collar 122 and may determine the weight on the drill bit 126 based on this measured length of the drill collar 122 and adjust such weight if necessary.

Figure 8A:
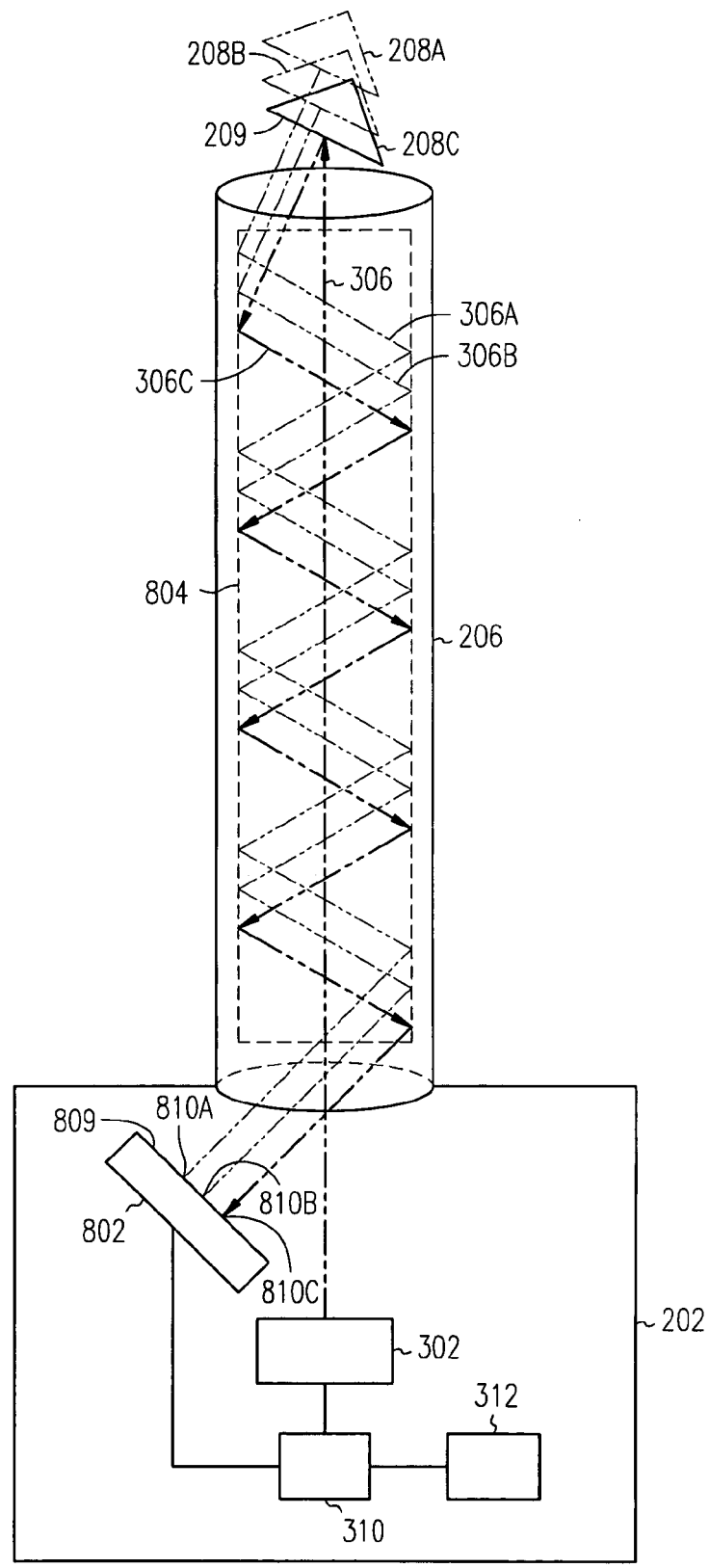
FIG. 8A illustrates a single signal carrier within a drill collar and instrumentation for determining a weight on a drill bit based on a measurement of a length of the drill collar of coherent radiation using angular displacement, according to one embodiment of the invention.

FIG. 8A illustrates a single signal carrier within a drill collar and instrumentation for determining a weight on a drill bit based on a measurement of a length of the drill collar of coherent radiation using angular displacement, according to one embodiment of the invention. FIG. 8A includes the signal carrier 206, the instrumentation section 202 and the plug 208 (208A, 208B and 208C) having the reflective surface 209. The instrumentation section 202 is located at a first end of the signal carrier 206, while the plug 208 is located at a second end of the signal carrier 206. As further described below, the plug 208 is shown at three different points in time (208A, 208B and 208C) to illustrate the result of the compression/expansion of the drill collar that includes the signal carrier 206.

The signal carrier 206 encloses a reflective box 804 having reflective sides for the reflecting of the coherent radiation. The reflective box 804 may be suspended on the signal carrier 206, wherein the reflective box 804 is attached at the second end of the signal carrier 206. Such a configuration may allow the reflective box 804 to withstand the torque that may be applied to the drill collar 122 during the downhole drilling operations.

The instrumentation section 202 includes the coherent radiation source 302, a detector 802, the control device 310 and the storage medium 312. The control device 310 is coupled to the coherent radiation source 302, the detector 802 and the storage medium 312. The detector 802 includes a screen 809. The detector 802 may be any type of coherent radiation detector/sensor including a charged coupled device (CCD) image sensor, a semiconductor-based image sensor (such as a Complimentary Metal-Oxide Semiconductor (CMOS) image sensor), etc. The detector 802 may be a black-and-white image sensor, a color image sensor, etc.

In operation, the coherent radiation source 302 emits the coherent radiation 306, which is reflected off the reflective surface 209 back toward the first end of the signal carrier 206 as a coherent radiation 306A, a coherent radiation 306B and a coherent radiation 306C. In particular, FIG. 8A illustrates the transmission of coherent radiation through the signal carrier 206 at three different lengths of the drill collar 122 (the coherent radiation 306A, the coherent radiation 306B and the coherent radiation 306C).

The coherent radiation source 302 may emit the coherent radiation 306 through the signal carrier 206 toward the plug 208, without reflecting off the reflective sides of the reflective box 804. The coherent radiation 306A, the coherent radiation 306B and the coherent radiation 306C are reflected off the reflective surface 209 of the plug 208 toward a first reflective side of the reflective box 804. The coherent radiation 306A, the coherent radiation 306B and the coherent radiation 306C are then reflected off the first reflective side of the reflective box 804 toward a second reflective side of the reflective box 804. The coherent radiation 306A, the coherent radiation 306B and the coherent radiation 306C are then reflected off the second reflective side of the reflective box 804 toward the first reflective side of the reflective box 804. The coherent radiation 306A, the coherent radiation 306B and the coherent radiation 306C are then reflected off the first reflective side of the reflective box 804 toward the second reflective side of the reflective box 804. The coherent radiation 306A, the coherent radiation 306B and the coherent radiation 306C are then reflected off the second reflective side of the reflective box 804 toward a location 810A, a location 810B and a location 810C on a screen 809 of the detector 802, respectively. For example, the location 810A, the location 810B and the location 810C may be one or more pixels on the screen 809. In some embodiments, a lens may be positioned in front of the screen 809 to focus the coherent radiation 306A, the coherent radiation 306B and the coherent radiation 306C onto the screen 809.

Accordingly, the length of the drill collar 122 that includes the signal carrier 206 (shown in FIG. 8A) affects the angular displacement of the coherent radiation 306. In particular, a change in the length of the drill collar 122 modifies the location on the screen 809 of the detector 802. The control device 310 may store the location on the screen 809 of the detector 802 into the storage medium 312. The values of the locations may be transmitted to a computer device at the surface. The computer device at the surface may determine a length of the drill collar 122 and may determine the weight on the drill bit 126 based on this location on the screen 809 of the detector 802. The computer device may, therefore, adjust the weight on the drill bit 126, if necessary.

Figure 8B:
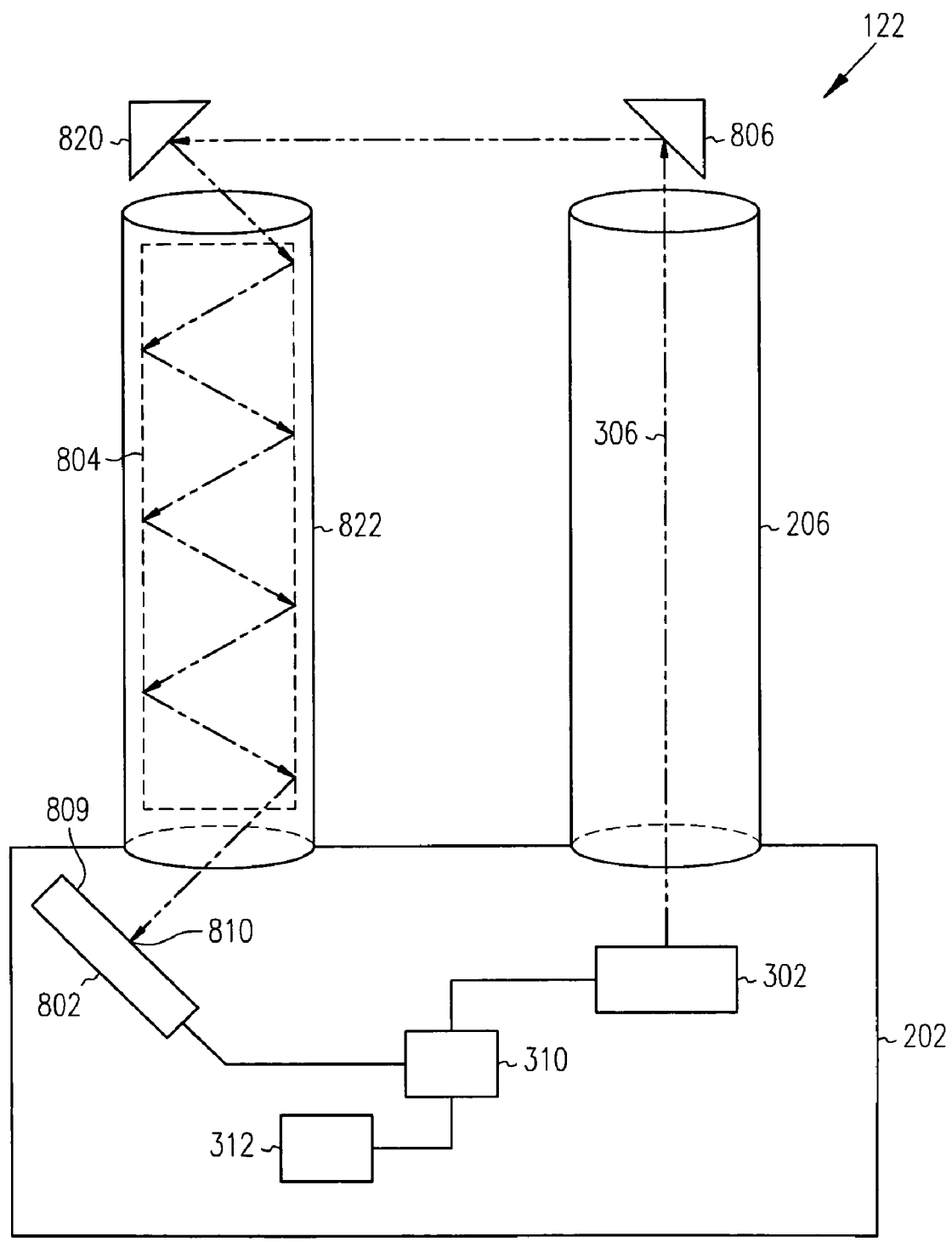
FIG. 8B illustrates two signal carriers within a drill collar and instrumentation for determining a weight on a drill bit based on a measurement of a length of the drill collar of coherent radiation using angular displacement, according to one embodiment of the invention.

FIG. 8B illustrates two signal carriers within a drill collar and instrumentation for determining a weight on a drill bit based on a measurement of a length of the drill collar of coherent radiation using angular displacement, according to one embodiment of the invention. This embodiment may also be used if the diameter of the signal carrier 206 and the size of the coherent radiation source 302 and the detector 802 are such that both the coherent radiation source 302 and the detector 802 cannot fit within the opening at the first end of the signal carrier 206.

FIG. 8B includes the signal carrier 206, a signal carrier 822, the instrumentation section 202, a reflective component 806 and a reflective component 820. The instrumentation section 202 is located at a first end of the signal carrier 206 and the signal carrier 822. The reflective component 806 is located at the opening of the second end of the signal carrier 206. The reflective component 820 is located at the opening of the second end of the signal carrier 822.

The signal carrier 822 encloses the reflective box 804 having reflective sides for the reflecting of the coherent radiation. The reflective box 804 may be suspended on the signal carrier 822, wherein the reflective box 804 is attached at the second end of the signal carrier 822. The instrumentation section 202 includes the coherent radiation source 302, the detector 802, the control device 310 and the storage medium 312. The control device 310 is coupled to the coherent radiation source 302, the detector 802 and the storage medium 312.

In operation, the coherent radiation source 302 emits the coherent radiation 306 down the signal carrier 206 without contact with or reflecting off the surfaces of the signal carrier 206. The reflective component 806 is positioned to receive the coherent radiation 306 and to reflect the coherent radiation 306 toward the reflective component 820. The reflective component 820 is positioned to receive the coherent radiation 306 and to reflect the coherent radiation 306 toward the first reflective side of the reflective box 804. The coherent radiation 306 is then reflected off the first reflective side of the reflective box 804 toward a second reflective side of the reflective box 804. The coherent radiation 306 is then reflected off the second reflective side of the reflective box 804 toward the first reflective side of the reflective box 804. The coherent radiation 306 is then reflected off the first reflective side of the reflective box 804 toward the second reflective side of the reflective box 804. The coherent radiation 306 is then reflected off the second reflective side of the reflective box 804 toward a location 810 on the screen 809 of the detector 802.

Accordingly, the length of the drill collar 122 that includes the signal carrier 206 (shown in FIG. 8B) affects the angular displacement of the coherent radiation 306. In particular, a change in the length of the drill collar 122 modifies the location on the screen 809 of the detector 802. The control device 310 may store the location 810 on the screen 809 of the detector 802 into the storage medium 312. The values of the location 810 may be transmitted to a computer device at the surface. The computer device at the surface may determine a length of the drill collar 122 and may determine the weight on the drill bit 126 based on this location on the screen 809 of the detector 802. The computer device may, therefore, adjust the weight on the drill bit 126, if necessary.

Figure 9:
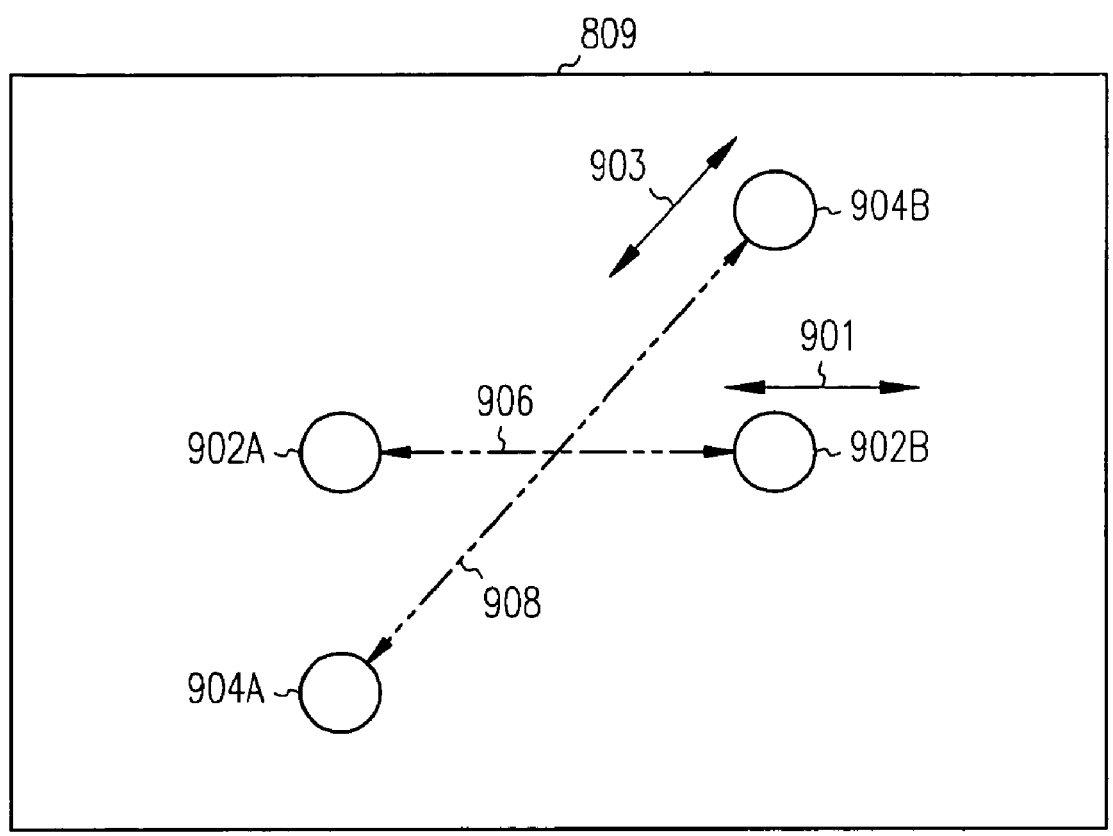
FIG. 9 illustrates a screen of a detector of coherent radiation for determining a weight on a drill bit based on angular displacement of the coherent radiation, according to one embodiment of the invention.

While described in reference to the measurement of the weight on a drill bit, embodiments of the invention are not so limited. For example, the angular displacement of coherent radiation 306 transmitted along one or more signal carriers (as described herein) may be used to measure vibration, torque, etc. In particular, FIG. 9 illustrates a screen of a detector of coherent radiation for determining the weight on a drill bit based on angular displacement of the coherent radiation, according to one embodiment of the invention. In particular, FIG. 9 illustrates one embodiment of the screen 809 of the detector 802 of FIGS. 8A-8B.

In a downhole drilling operation, the environment in which the screen 809 may receive the coherent radiation 306 may be vibrational. Additionally, the drill collar 122 that includes the detector 802 may be subject to torque during the drilling operations. Accordingly, the location where the coherent radiation is received on the screen 809 may vary based on the length of the drill collar 122, the torque applied thereto as well as the vibrations downhole. Therefore, in some embodiments, the detector 802 may be used to determine a weight of the drill bit 126 (as described above), as a torque sensor and/or a vibration sensor.

To illustrate, FIG. 9 includes different locations that the coherent radiation is received based on the length of the drill collar 122, the torque applied to the drill collar 122 and the vibrations that the drill collar 122 is subject there to. In particular, the screen 809 may receive coherent radiation in a direction 901 between a location 902A and a location 902B and at different points along a line 906 between the location 902A and the location 902B. The screen 809 also may receive coherent radiation in a direction 903 between a location 904A and a location 904B and at different points along a line 908 between the location 904A and the location 904B.

The different locations along the direction 901 may be indicative of the length of the drill collar 122. Accordingly, an average value of the different locations along the direction 901 may indicate the length of the drill collar 122. The different locations along the direction 903 may be indicative of the torque applied to the drill collar 122. Therefore, an average value of the different locations along the direction 903 may be indicative of the torque applied thereto. The vibration of the drill collar 122 may be based on the expanse of the locations along the direction 901 and/or the direction 903. For example, the distance between the location 902A and the location 902B may indicate the vibration that the drill collar 122 is subjected thereto. Additionally or alternatively, the distance between the location 904A and the location 904B may indicate the vibration that the drill collar 122 is subjected thereto.

FIG. 10 illustrates a computer device for determining the weight on a drill bit based on a length of a drill collar measured using a coherent radiation, according to one embodiment of the invention. As illustrated in FIG. 10, a computer device 1000 comprises processor(s) 1002, a measurement logic 1090 and a weight-on-bit logic 1092. The computer device 1000 also includes a memory 1030, a processor bus 1022, and an input/output controller hub (ICH) 1024. The processor(s) 1002, the memory 1030, and the ICH 1024 are coupled to the processor bus 1022. The processor(s) 1002 may comprise any suitable processor architecture. The computer device 1000 may comprise one, two, three, or more processors, any of which may execute a set of instructions in accordance with embodiments of the invention.

The memory 1030 stores data and/or instructions, and may comprise any suitable memory, such as a random access memory (RAM). For example, the memory 1030 may be a Static RAM (SRAM), a Synchronous Dynamic RAM (SDRAM), DRAM, a double data rate (DDR) Synchronous Dynamic RAM (SDRAM), etc. As shown, the memory 1030 may store calibration table(s) 1094. A graphics controller 1004 controls the display of information on a display device 1006, according to an embodiment of the invention.

The ICH 1024 provides an interface to Input/Output (I/O) devices or peripheral components for the computer system 1000. The ICH 1024 may comprise any suitable interface controller to provide for any suitable communication link to the processor(s) 1002, the memory 1030 and/or to any suitable device or component in communication with the ICH 1024. For one embodiment of the invention, the ICH 1024 provides suitable arbitration and buffering for each interface.

In one embodiment, the ICH 1024 provides an interface to one or more suitable Integrated Drive Electronics (IDE)/Advanced Technology Attachment (ATA) drive(s) 1008, such as a hard disk drive (HDD) or compact disc read only memory (CD ROM) drive, or to suitable universal serial bus (USB) devices through one or more USB ports 1010. In an embodiment, the ICH 1024 also provides an interface to a keyboard 1012, a mouse 1014, one or more suitable devices through one or more parallel ports 1018 (e.g., a printer), and one or more suitable devices through one or more serial ports 1016. In some embodiments, the ICH 1024 also provides a network interface 1020 through which the computer system 1000 can communicate with other computers and/or devices. At least a part of the calibration table(s) 1094 may also be stored in one of the IDE/ATA drive(s) 1008, a cache internal to the processor(s) 1002, etc. In some embodiments, an I/O device may be coupled to one of the USB port(s) 1010, one of the serial port(s) 1016 or one of the parallel port(s) 1018 to receive the measurements of the coherent radiation from the control device 310 through a telemetric operation.

In one embodiment, the measurement logic 1090 and the weight-on-bit logic 1092 may be instructions executing within the processor(s) 1002. Therefore, the measurement logic 1090 and the weight-on-bit logic 1092 may be stored in a machine-readable medium that are a set of instructions (e.g., software) embodying any one, or all, of the methodologies described herein. For example, the measurement logic 1090 and the weight-on-bit logic 1092 can reside, completely or at least partially, within the memory 1030, the processor(s) 1002, one of the IDE/ATA drive(s) 1008, etc. In some embodiments, the measurement logic 1090 and the weight-on-bit logic 1092 may be hardware logic. In an embodiment, the measurement logic 1090 and the weight-on-bit logic 1092 may be a combination of software, firmware and/or hardware.

FIG. 11 illustrates a flow diagram for drilling a borehole using a weight on the drill bit that is determined based on a length of a drill collar measured using a coherent radiation, according to one embodiment of the invention. In particular, FIG. 11 illustrates a flow diagram 1100 of one embodiment of the operations of the system 110 of FIG. 1, the embodiment of FIG. 3 and the computer device 1000 of FIG. 10. While described in reference to the embodiment of FIG. 3, such operations may also be performed by the embodiments of FIGS. 4-8.

In block 1102, a borehole is drilled through a formation with a drill string having a drill collar. With reference to the embodiment of FIG. 1, the drill bit 126 on the drill string 108 (having the drill collar 122) drills the borehole 112 through the subsurface formations 114. Control continues at block 1104.

In block 1104, a length of the drill collar is measured based on a coherent radiation transmitted along a length of the drill collar. With reference to the embodiment of FIG. 3, the coherent radiation source 302 emits the coherent radiation 306, which is received by the receiver 304. The control device 310 stores, into the storage medium 312, a measurement of the coherent radiation 306 that is used to determine the length of the drill collar 122. This measurement may be transmitted to the surface to the computer device 1000. The measurement logic 1090 may determine the length of the drill collar 122 based on this received measurement.

For example, the measurement may include a "time-of-flight" measurement, a phase difference between the coherent radiation 306 emitted and the coherent radiation 306 received, angular displacement, etc. The measurement logic 1090 may then determine a length of the drill collar 122 based on this measurement using previously calibrated value(s) stored in the calibration table(s) 1094. Previously calibrated value(s) may be determined based on a number of calibration tests. For example, the relation between different lengths of the drill collar 122 and the measurements using the coherent radiation 306 may be determined using a mechanical or hydraulic press at the surface prior to a drilling operation. The drill collar 122 may be placed in such a press at varying pressure to vary the length. Different measurements (e.g., a "time-of-flight" measurement, a phase difference between the coherent radiation 306 emitted and the coherent radiation 306 received, angular displacement) of the coherent radiation 306 may be made while the drill collar 122 is in such a press at different pressures. Alternatively or in addition, these different calibrated values for the conversion of a measurement using coherent radiation to a weight on the drill bit 126 may be performed while the drill string 108 is downhole. Furthermore, over time the drill collar 122 may be permanently deformed due to the stresses applied thereto. This deformation may alter the length of the drill collar 122. Therefore, the drill collar 122 may be periodically re-calibrated (as described herein).

As described, the different pressures on the drill collar 122 may vary its length. The measurements (such as the "time-of-flight", phase difference, angular displacement, etc.) using coherent radiation may then be performed at the different lengths of the drill collar 122. Additionally, the amount of pressure placed on the drill collar 122 may be translated into a pressure (a weight) on the drill collar 122. During a drilling operation, such weight on the drill collar 122 is transferred to the drill bit 126. Therefore, the calibration table(s) 1094 may be used to translate a measurement of the coherent radiation along a length of the drill collar into a weight on the drill collar 122. Control continues at block 1106.

In block 1106, a weight on the drill bit of the drill string is determined based on the length of the drill collar. With reference to the embodiment of FIG. 10, the weight-on-bit logic 1092 determines the weight on the drill bit 126 based on the length of the drill collar 122 generated by the measurement logic 1090. As described above, the drill collar 122 is calibrated to determine a weight on the drill bit 126 based on the length of the drill collar 122. For example, a pressure may be applied to the drill collar 122, which is indicative of the weight applied thereto. The length of the drill collar 122 using coherent radiation may be measured while such pressure is being applied. Accordingly, a number of different measurements of the drill collar 122 may be made, while different pressures are applied to the drill collar 122. These different measurements of the length of the drill collar 122, while the different pressures are being applied thereto, may be stored in the calibration table(s) 1094. The weight-on-bit logic 1092 may obtain the weight on the drill bit 126 based on a lookup into the calibration table(s) 1094 using the measured length of the drill collar 122. Control continues at block 1108.

In block 1108, a determination is made of whether the weight on the drill bit needs to be adjusted. With reference to the embodiment of FIG. 10, the weight-on-bit logic 1022 makes this determination. Different drilling configurations may require different weights to be applied to the drill bit 126 in order to optimize the drilling of the borehole 112 without damaging the drill bit 126. For example, a fixed cutter drill bit, such as a polycrystalline diamond compact (PDC) drill bit may need a different weight applied thereto in comparison to a roller cone drill bit. Accordingly, the weight-on-bit logic 1022 may make this determination regarding adjustment of the weight based on the drilling configuration. Upon determining that the weight on the drill bit does not need to be adjusted, control continues at block 1102, where the drilling operation is continuing.

In block 1110, upon determining that the weight on the drill bit needs to be adjusted, the weight on the drill bit is adjusted. With reference to the embodiment of FIGS. 1 and 10, the weight-on-bit logic 1092 may cause the weight on the drill bit 126 to be adjusted by raising the drill string 108 a given height, etc. Control continues at block 1102, where the drilling operation is continuing.

While the flow diagram 1100 illustrates a given order of operations, in some embodiments, such operations may be performed simultaneously, simultaneously in part and/or in a different order. For example, the operations in the blocks 1104-1110 may be performed at least simultaneously in part with the drilling operations in the block 1102.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for measuring the weight on a drill bit during drilling operations using coherent radiation, in accordance with embodiments of the invention. A figure shows a flow diagram illustrating operations for measuring the weight on a drill bit during drilling operations using coherent radiation. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. For example, while embodiments are described in reference to determining a weight on the drill bit using a computer device at the surface after receipt of a measurement of coherent radiation from downhole, in an alternative embodiment, logic downhole may make such a determination. Such logic may then control the adjustment of the weight on the drill bit downhole using different types of telemetry for adjusting the weight. To further illustrate different permutations included herein, while FIG. 6B illustrates the coherent radiation 306 reflecting off the reflecting surfaces of the signal carrier 206 toward the first end of the signal carrier 206, in some embodiments, the configuration in FIG. 6B may include a reflective box enclosed by the signal carrier 206 (similar to the reflective box illustrated in the configurations of FIGS. 8A-8B. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   drilling, with a drill string having a drill collar, a borehole through a formation;
   measuring a length of the drill collar based on a coherent radiation transmitted along a length of the drill collar; and
   determining a weight on a drill bit of the drill string based on the length of the drill collar.

2. The method of claim 1, wherein measuring the length of the drill collar based on the coherent radiation transmitted along the length of the drill collar comprises measuring a time-of-flight of the coherent radiation along the length of the drill collar.

3. The method of claim 2, wherein measuring the time-of-flight of the coherent radiation along the length of the drill collar comprises measuring the time-of-flight of the coherent radiation from a first end of the drill collar to a second end of the drill collar and back to the first end.

4. The method of claim 3, wherein measuring the length of the drill collar based on the coherent radiation transmitted along the length of the drill collar comprises comparing a reference signal to the time-of-flight of the coherent radiation.

5. The method of claim 1, wherein measuring the length of the drill collar based on the coherent radiation transmitted along the length of the drill collar comprises measuring a change in a phase of the coherent radiation.

6. A method comprising:
   receiving a measurement of coherent radiation that has traversed along a length of a drill collar on a drill string; and
   generating a value for a weight on a drill bit on the drill string based on the measurement of the coherent radiation.

7. The method of claim 6, further comprising determining a length of the drill collar based on the measurement of the coherent radiation.

8. The method of claim 7, wherein generating the value for the weight on the drill bit on the drill string based on the measurement of the coherent radiation comprises generating the value for the weight on the drill bit on the drill string based on the length of the drill collar.

9. The method of claim 7, wherein determining the length of the drill collar based on the measurement of the coherent radiation comprises:
   performing a lookup into a table of one or more previously calibrated values; and
   comparing the lookup to the measurement of the coherent radiation.

10. The method of claim 6, further comprising adjusting the weight on the drill bit based on the generated value for the weight of the drill bit.

11. The method of claim 6, wherein the measurement of the coherent radiation that has traversed along the length of the drill collar of the drill string is based on a time of flight measurement of the coherent radiation along the length of the drill collar.

12. The method of claim 6, wherein the measurement of the coherent radiation that has traversed along the length of the drill collar of the drill string is based on a change in phase of the coherent radiation.

13. A machine-readable medium that provides instructions, which when executed by a machine, cause said machine to perform operations comprising:
   receiving a measurement of coherent radiation that has traversed along at least a part of a length of a drill collar on a drill string;
   determining the at least the part of the length of the drill collar based on the measurement of the coherent radiation;
   generating a value for a weight on a drill bit on the drill string based on the at least part of the length of the drill collar.

14. The machine-readable medium of claim 13, wherein the at least the part of the length of the drill collar based on the measurement of the coherent radiation comprises:
   performing a lookup into a table of one or more previously calibrated values; and
   comparing the lookup to the measurement of the coherent radiation.

15. The machine-readable medium of claim 13, further comprising adjusting the weight on the drill bit based on the generated value for the weight of the drill bit.

16. The machine-readable medium of claim 13, wherein the measurement of the coherent radiation that has traversed along the length of the drill collar of the drill string is based on a time of flight measurement of the coherent radiation along the length of the drill collar.

17. The machine-readable medium of claim 13, wherein the measurement of the coherent radiation that has traversed along the length of the drill collar of the drill string is based on a change in phase of the coherent radiation.

* * * * *